United States Patent [19]

Mitchell et al.

[11] 3,925,709
[45] Dec. 9, 1975

[54] OVERCURRENT PROTECTION CIRCUIT FOR AC SYSTEMS

[75] Inventors: James T. Mitchell; William W. Billings, both of Lima, Ohio

[73] Assignee: Westinghouse Electric Corporation, Pittsburgh, Pa.

[22] Filed: Aug. 13, 1973

[21] Appl. No.: 387,993

[52] U.S. Cl. .......... 317/33 VR; 317/31; 317/33 SC; 317/DIG. 5; 323/9; 323/21; 307/311
[51] Int. Cl.² .................................. H02H 3/01
[58] Field of Search .......... 323/9, 21, 8, 24; 317/31, 317/33 R, 33 VR, 33 SC, 262 R, DIG. 5; 307/311; 250/200

[56] References Cited
UNITED STATES PATENTS

| | | | |
|---|---|---|---|
| 3,351,818 | 11/1967 | Zielinski | 317/DIG. 5 |
| 3,480,834 | 11/1969 | Billings | 317/31 |
| 3,693,060 | 9/1972 | Joyce | 317/262 R |
| 3,711,763 | 1/1973 | Peterson | 317/33 V R |
| 3,723,854 | 3/1973 | Kita | 323/9 UX |
| 3,783,354 | 1/1974 | Wong | 317/33 SC |
| 3,811,073 | 5/1974 | Shuey et al. | 323/24 X |
| 3,818,275 | 6/1974 | Shimp | 317/33 R |

OTHER PUBLICATIONS
Electronics Nov. 23, 1970; Vol. 43, No. 24; p. 68; Article by James Van Zee.

Primary Examiner—Gerald Goldberg
Attorney, Agent, or Firm—G. H. Telfer

[57] ABSTRACT

An overcurrent protection circuit for AC systems is provided including a means for developing a full wave DC sensing voltage whose peak magnitude is proportional to the load current of the system to be protected and that sensing voltage is applied to an optical isolator whose secondary circuit includes an optically responsive device having a conduction threshold voltage in a predetermined relation to the sensing voltage magnitude for normal load current; the secondary circuit also includes means responsive to current through the optically responsive device to result in an overcurrent trip signal upon occurrence of predetermined overcurrent conditions. The overcurrent protection circuit is particularly suitable for use in solid state power controllers and imposes minimal power supply requirements as compared with prior circuits for this purpose while exhibiting good performance and reliability.

4 Claims, 3 Drawing Figures

OVERCURRENT PROTECTION CIRCUIT FOR AC SYSTEMS

BACKGROUND OF THE INVENTION

This invention relates to circuits for protection against overcurrent conditions and more particularly to circuit portions for producing a prescribed signal upon the occurrence of an overcurrent condition.

Electrical power systems are required to be operative over a range of conditions limited by the current handling capability of the wiring and loads of the system. For economics and size considerations it is frequently desirable to minimize the power handling capability of the system but it is required to have a means for determining when current levels are approaching that at which wiring or components may be damaged.

In power systems for certain types of applications, such as aircraft electrical systems, the need for minimal size and weight, yet accompanied by high reliability, are particularly acute. The functions of the overcurrent protection circuit for the protection of the system are important as well as the interest in minimizing the size and weight of the overcurrent protection system itself and its associated elements, including power supply requirements for that circuit portion.

In copending application Ser. No. 337,969, filed Mar. 5, 1973 by K. C. Shuey and D. E. Baker and assigned to the present assignee now U.S. Pat. No. 3,811,073, May 14, 1974, there is disclosed an improved AC current sensing circuit that is particularly useful for overcurrent protection in the type of environment to which the present invention is most advantageously applied. Reference may be made to that copending application for background to the types of systems of interest here. One significant improvement afforded by the invention of the copending application is that the sensing circuit itself requires no energization apart from voltage developed directly from the AC load circuit.

In another copending application Ser. No. 387,991, filed Aug. 13, 1973, now U.S. Pat. No. 3,879,652, Apr. 22, 1975, by W. W. Billings and assigned to the present assignee disclosure is made of AC power controller systems where the prime emphasis in on minimizing internal power supply requirements, that is, to avoid the necessity or complex or multiple direct voltage supplies for the internal circuit portions. The sensing circuit portion of the first mentioned copending application is suitable for use in such systems. However, the overall current protection circuit disclosed therein does require an additional DC supply voltage, since it relies on the use of operational amplifiers to produce an overcurrent signal, and therefore does not fully satisfy the requirements of the second mentioned copending application.

The present invention is primarily an improvement over the overcurrent protection circuit disclosed in Ser. No. 337,969 and is one that makes it particularly suitable for use in solid state power controllers as described in Ser. No. 387,991.

SUMMARY OF THE INVENTION

In accordance with this invention, an overcurrent protection circuit for AC systems is provided including a means for developing a full wave DC sensing voltage whose peak magnitude is proportional to the load current of the system to be protected and that sensing voltage is applied to an optical isolator whose secondary circuit includes an optically responsive device having a conduction threshold voltage in a predetermined relation to the sensing voltage magnitude for normal load current; the secondary circuit also includes means responsive to current through the optically responsive device to result in an overcurrent trip signal upon occurrence of predetermined overcurrent conditions. The overcurrent protection circuit of this invention is particularly suitable for use in solid state power controllers and imposes minimal power supply requirements as compared with prior circuits for this purpose while exhibiting good performance and reliability.

The current sensing portion of the overcurrent protection circuit can, as in Ser. No. 337,969 be formed without requiring a separate voltage supply and by the improvement of this invention the secondary portion, that here resides on the output side of the optical isolator, requires no additional supply voltage other than that already available in power controllers of the type referred to in Ser. No. 387,991. This comes about because in contrast to the use of operational amplifiers, the present circuit only requires a small number of components that are responsive to the conduction current of the secondary photo-diode of the logic isolator. The power required for supplying the logic circuit elements that respond to current through the photo-diode may also be supplied from the same DC voltage supply that is otherwise present.

THE DRAWINGS

PREFERRED EMBODIMENTS

Figure 1:
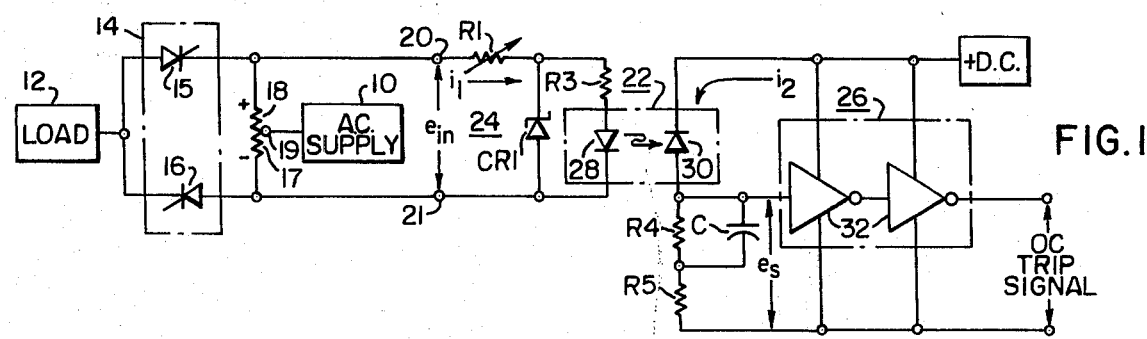
FIG. 1 is a schematic circuit diagram illustraing one embodiment of an overcurrent protection circuit in accordance with this invention.

Referring to FIG. 1, there is shown a portion of an AC power controller for controlling the supply of power between an AC voltage supply 10 and a load 12 by means of an AC switch 14 that in this embodiment comprises a pair of inverse parallel thyristors 15 and 16. The above mentioned copending applications may be referred to for further information with respect to the overall power controller. In accordance with the teachings of Ser. No. 337,969 a resistive shunt is connected with the thyristors and actually comprises a pair of resistors 17 and 18 having a common point 19 connected to the supply circuit. The resistors 17 and 18 in cooperation with the rectification properties of the thyristors 15 and 16 produce, from the AC supply, a full wave rectified DC voltage $e_{in}$ that appears across input terminals 20 and 21 to the overcurrent protection circuit.

The circuit has a central feature that is an optical isolator 22 and has primary and secondary circuit portions 24 and 26, respectively, on each side of the optical isolator. The primary circuit portion 24 includes a series circuit branch including resistors R1 and R3 and an optically responsive solid state device 28, such as a light emitting diode. The optically responsive device is poled so as to conduct the current developed at the input that is a full wave rectified DC voltage. Across the resistor R3 and the optically responsive device is a voltage reference or Zener diode CR1.

The secondary circuit portion 26 includes an optically sensitive device 30, such as a photodiode, in optically coupled relation with the optically responsive device 28 of the primary circuit. The anode of the photodiode 30 is connected to a time-delay network comprising a capacitor C and resistors R4 and R5 and is also connected to the input of a voltage level detector such as a logic gate 32, such as a NAND gate, in one or more stages, here including stages Z2A and Z2B. The cathode of the photodiode is connected to a DC source that is applied in reverse polarity to the photodiode. The logic gate stages are also supplied at their bias terminals by the same source of DC voltage.

The voltage level detector 32 may take various forms in accordance with known electronic circuit practices. Besides logic gates it may principally comprise such things as a flip-flop, an operational amplifier, a Schmitt trigger circuit, or a differential amplifier type of voltage level detector as disclosed in Billings U.S. Pat. No. 3,480,834.

Figure 2:
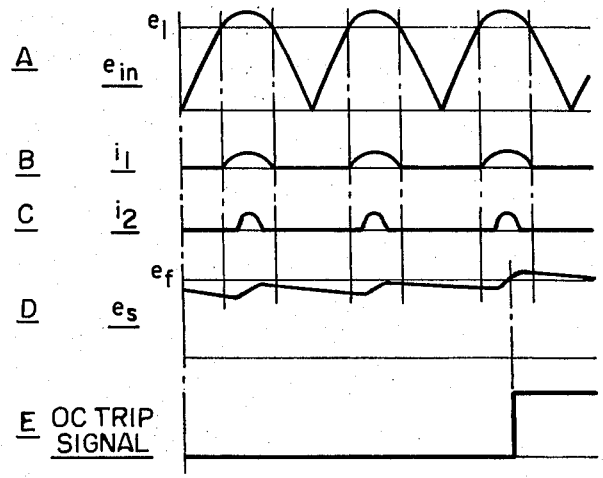
FIG. 2 is a set of waveforms useful in understanding the operation of the circuit of FIG. 1.

In operation, the overcurrent detection circuit is energized by the full wave rectified DC voltage $e_{in}$ produced by the sensing circuit portion. Waveform A of FIG. 2 illustrates $e_{in}$ representing the input voltage. Also illustrated on waveform A is the line showing the level of a voltage $e_1$ that corresponds to a chosen current level above which some overcurrent protection is desired. In the illustration it can be seen that $e_{in}$ exceeds $e_i$ during portions of the peak of each half cycle.

The light emitting diode 28 of the optical isolator 22 has, as is characteristic of such devices, a relatively constant and low temperature coefficient threshold voltage, such as 1.1 volts DC, which is related to the arbitrarily chosen level $e_1$. In a preferred case the threshold voltage and $e_1$ are the same. Therefore, when the peak of the full wave rectified DC sensing voltage $e_{in}$ exceeds 1.1 volt DC, current $i_1$ (FIG. 2, waveform B) begins to flow in pulses through the light emitting diode. The occurrence of conduction through the light emitting diode 28 causes the emission of radiation to which the photodiode 30 is sensitive sufficiently to cause a reverse current flow therethrough, $i_2$, (FIG. 2 waveform C).

The current $i_2$ causes capacitor C to charge at a rate determined by the current magnitude, the RC time constant of the components C, R4 and R5 and the instantaneous charge level on the capacitor. These considerations are important so that at normal load levels very little or no current flows in the secondary circuit 30 because the input threshold voltage was not exceeded. Also, when the overload level causes the input threshold to be exceeded, the currents flowing in the circuit increase as the overload increases. Furthermore, the greater the charging current, the faster the value of voltage across the capacitor C will rise. Thus, the faster the overcurrent fault signal will occur in response to increasing levels of overloads. In the waveforms are illustrated the current pulses for $i_1$ and $i_2$. Waveform D of FIG. 2 illustrates variation of the voltage occurring at the logic circuit input $e_s$, in relation to the gate input voltage that is required for initiating a change of output. In waveform D, $e_f$ is the chosen value of voltage $e_s$ at which a trip signal occurs. Waveform E shows the occurrence of a trip signal.

Resistor R5 is primarily to provide instantaneous trip signals at high levels of fault current. This will take place because the initial instantaneous voltage drop caused by $i_2$ through R5 itself, at large fault currents, without a charge having had time to build up on capacitor C, is adequate to cause conduction of logic gate 32 and the overcurrent trip signal to appear at the output of the logic gate.

The resistor R1 is shown as variable as is a preferred form of the circuit in order to provide the opportunity to trim R1 for the sake of establishing a minimum pickup level and to trim for establishing an appropriately prompt tripping level upon large overcurrents. Also beneficial is a positive temperature coefficient resistor for R5 for idealizing the performance over wide temperature variations.

In the primary circuit, Zener diode CR1 and resistor R3 are utilized to protect optical isolator 22 in applications where short circuited loads could cause current flow that exceeds the capability of the isolator.

Figure 3:
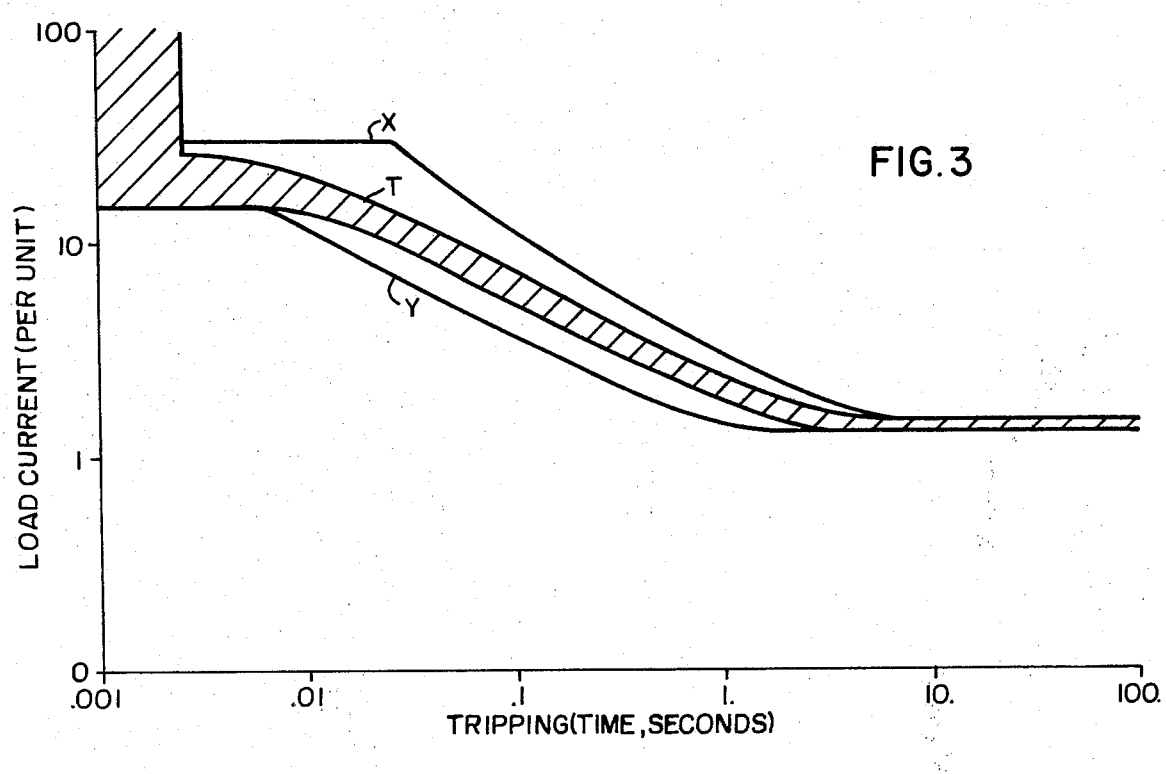
FIG. 3 is a chart of performance data for circuits of this invention.

Circuits such as that shown and described have been successfully operated and have performed well over a temperature range of −55°C to +71°C. FIG. 3 shows in band T the performance of circuits in accordance with the invention in relation to overload protection limits x and y imposed by Military Specification MIL-P-81653 over that temperature range.

A further example of an overcurrent protection circuit in accordance with the invention may be seen by referring to copending application Ser. No. 387,991 filed Aug. 13, 1973 in relation to other elements of a power controller in which the invention has been successfully used.

It is therefore seen that a relatively simple overcurrent protection circuit is provided that is essentially self-powered and is less susceptible to failures that cause a fault output signal and hence provides greater overall reliability. The simplicity of the circuit and the components required permit miniaturization to minimize size and weight.

We claim:

1. An overcurrent protection circuit for AC systems, comprising;
    means for developing a full wave DC sensing voltage whose magnitude is proportional to the load current of the system to be protected;
    an optical isolator comprising an optically responsive solid state device and an optically sensitive solid state device in optically coupled relationship, said optically responsive device having a threshold voltage for initiation of conduction that has a predetermined relationship with the sensing voltage magnitude for normal load current;
    means to apply said sensing voltage to said optically responsive solid state device;
    said optically responsive device conducting when said sensing voltage exceeds the threshold voltage and producing radiation to which said optically sensitive device is sensitive;
    means responsive to the current through said optically sensitive device to result in an overcurrent trip signal upon occurrence of predetermined overcurrent conditions, said responsive means comprising a resistive-capacitive time delay circuit and a voltage level detector which in combination respond to magnitude of an overcurrent condition to produce a trip signal faster for larger overcurrents.

2. The subject matter of claim 1 wherein:
    said means for developing a full wave DC sensing voltage comprises a resistive shunt and rectifier means connected between the supply and the load.

3. The subject matter of claim 2 wherein:

said rectifier means comprises a pair of thyristors connected in reverse parallel relation, said pair of thyristors being connected as the main switch elements between the supply and the load circuit.

4. An overcurrent protection circuit for an AC system, comprising:

means for developing a full wave DC sensing voltage whose magnitude is proportional to the load current of the system to be protected, said sensing voltage means comprising a resistive shunt and rectifier means between a supply and a load of the system;

an optical isolator comprising an optically responsive solid state device and an optically sensitive solid state device in optically coupled relationship, said optically responsive device having a threshold voltage for initiation of conduction that has a predetermined relationship with the sensing voltage magnitude for normal load current;

a first resistor connected in series with said optically responsive device and a voltage limiting device connected across both said resistor and said optically responsive device;

means to apply said sensing voltage to said optically responsive solid state device;

said optically responsive device conducting when said sensing voltage exceeds the threshold voltage and producing radiation to which said optically sensitive device is sensitive;

means responsive to the current through said optically sensitive device to result in an overcurrent trip signal upon occurrence of predetermined overcurrent conditions, said responsive means comprising a time delay circuit portion and a voltage level detector circuit portion;

said time delay circuit portion comprising second and third resistors connected in series with said optically sensitive device and a capacitor connected across said second resistor;

said voltage level detector circuit portion comprising at least one logic gate having an input connected to a point between said optically sensitive device and said second resistor and an output for deriving said overcurrent trip signal; and, a direct current voltage source supplying said optically sensitive device and said at least one logic gate from a common point.

* * * * *